INVENTOR.
MELVILLE C. CREUSERE
BY G. W. O'Brien
ATTORNEY

Oct. 22, 1957 M. C. CREUSERE 2,810,519

MAGNETIC AMPLIFIER

Filed Aug. 13, 1954 2 Sheets-Sheet 2

INVENTOR.
MELVILLE C. CREUSERE
BY G. D. O'Brien
ATTORNEY

United States Patent Office 2,810,519

Patented Oct. 22, 1957

2,810,519

MAGNETIC AMPLIFIER

Melville C. Creusere, China Lake, Calif., assignor to the United States of America as represented by the Secretary of the Navy Application August 13, 1954, Serial No. 449,810

7 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic amplifiers and particularly to a summing magnetic amplifier which is particularly useful as a component of analogue computers. previously known summing magnetic amplifiers have required a plurality of control windings, one for each electrical input. In such summing amplifiers, errors in the number of turns of any of the control windings will reduce the accuracy of the summation, and since the total number of turns which can be wound on the cores of a magnetic amplifier are limited, the maximum number of turns in each control winding will vary inversely with the number of control windings. Further, the magnitude of the positive feed back required to obtain a given open loop gain also varies inversely as the number of turns in each control winding.

The summing magnetic amplifier constituting this invention uses a single control winding so that a small error in the number of turns of the control winding will not adversely affect the computing accuracy of the amplifier. Further, since there is only one control winding, it may have a large number of turns, larger than the number of turns of each control winding of a magnetic amplifier having a plurality of control windings. This in turn requires a positive feedback of fewer ampere turns for a given open loop gain as compared with previously known summing magnetic amplifiers. As a result of this construction, the open loop linearity and accuracy of the summing amplifier are increased.

It is, therefore, an object of this invention to provide an improved summing magnetic amplifier having a single control winding.

It is a further object of this invention to provide an improved magnetic amplifier for summing a plurality of input voltages.

It is a still further object of this invention to provide a magnetic amplifier which is capable of adding algebraically a plurality of input voltages.

It is a further object of this invention to provide a summing magnetic amplifier having a single control winding in which voltages are balanced across the control windings so that substantially no current flows through the control winding.

It is a further object of this invention to provide a magnetic amplifier capable of solving linear equations having coefficients other than one.

It is still another object of this invention to provide a magnetic amplifier having a very high input impedance and a low output impedance.

Other objects and many of the attendant advantages of this invention will be readily apreciated as the same become better understood by reference to the following detailed description when considered in connection with the accompanying drawings wherein.

Figure 1:
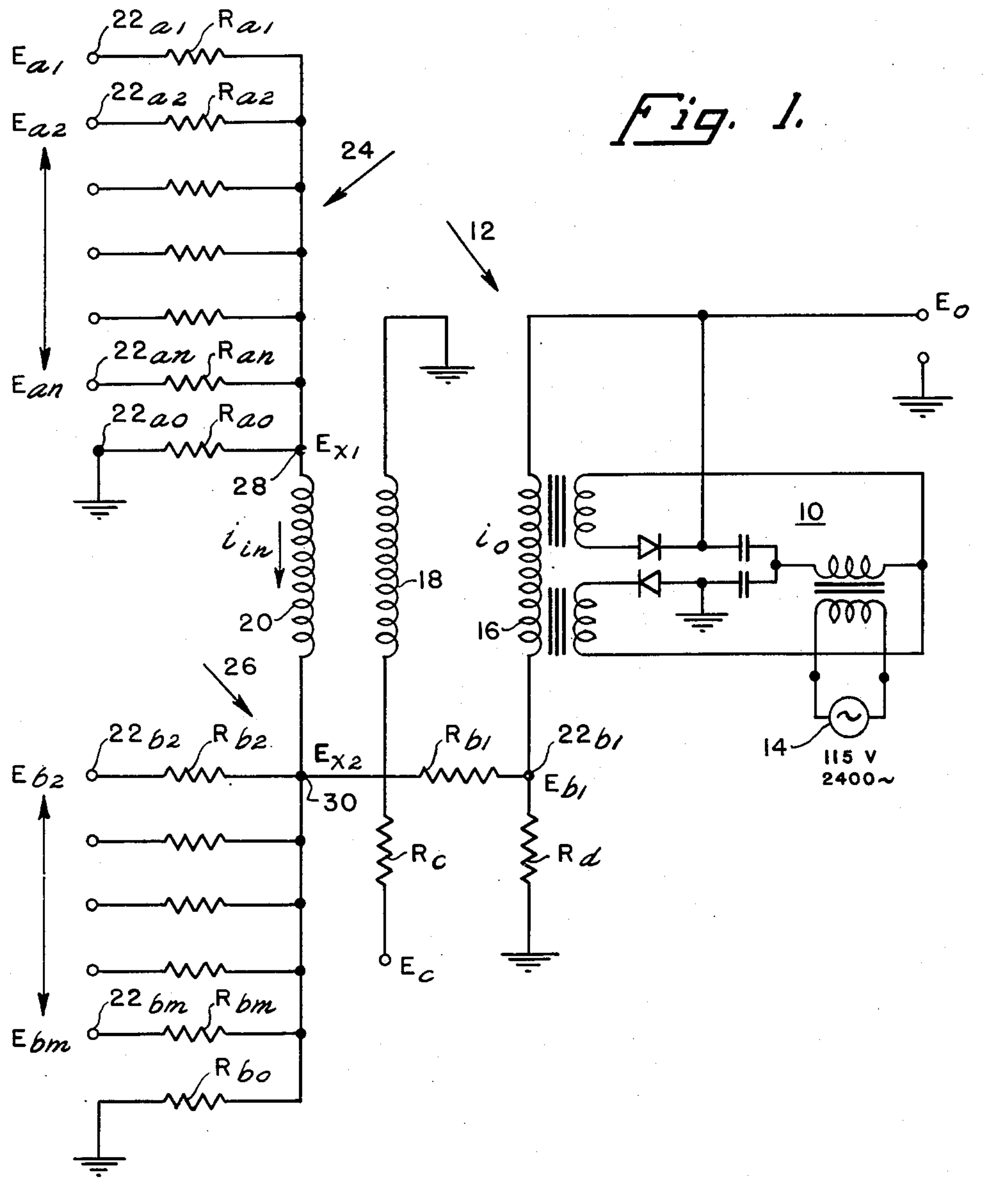
Fig. 1 is a schematic diagram of the summing magnetic amplifier.

Referring now to Fig. 1 the output circuit 10 of the summing magnetic amplifier 12 is arranged in the form of a standard voltage doubler magnetic amplifier, although any high gain type of magnetic amplifier could be used. In a preferred example, alternating current at 115 volts 2400 cycles per second is provided by source 14. The use of such high frequency A. C. permits the size of the components of the magnetic amplifier to be minimized. Obviously other frequencies and voltages may be used if desired. The output current, $i_o$ flows through positive feedback winding 16 and load resistor $R_d$. Positive feedback winding 16 increases the open loop gain of the amplifier, minimizes the output impedance, and increases the summing accuracy.

The direct current bias voltage, $E_c$, is applied across the bias winding 18 of the summing magnetic amplifier 12 through bias resistor $R_c$. The values of $E_c$ and $R_c$ are chosen to provide a constant bias current such that the output voltage $E_o$ will be directly proportional to the input current, $i_{in}$, which flows through control winding 20. Because of the characteristics of magnetic amplifier 12, $E_o$ will never equal 0, and the variation of $E_o$ with respect to $i_{in}$ will not be linear below a certain minimum value of $E_o$. The voltage $E_o$ will be substantially equal to the voltage at point 22$_{b1}$ because of the fact that the resistance of the positive feedback winding 16 is low as compared to other resistances in the circuit.

Substantially D. C. input voltages $E_{a1}$, $E_{a2}$ . . . $E_{an}$ are applied to input terminals 22$_{a1}$, 22$_{a2}$ . . . 22$_{an}$ of input circuit 24, respectively. Input voltages $E_{b1}$, $E_{b2}$ . . . $E_{bm}$ are applied to input terminal 22$_{b1}$, 22$_{b2}$ . . . 22$_{bm}$ of input circuit 26, respectively. Input voltages $E_{a1}$, $E_{a2}$ . . . $E_{an}$ are applied to control terminal 28 of control winding 20 through resistors $R_{a1}$, $R_{a2}$ . . . $R_{an}$, respectively. Input voltages $E_{b1}$, $E_{b2}$ . . . $E_{bm}$ are applied to control terminal 30 of control winding 20 through input resistors $R_{b1}$, $R_{b2}$ . . . $R_{bm}$, respectively.

For purposes of generalizing the theory of operation balancing resistor $R_{ao}$ is connected between terminal 28 and ground and balancing resistor $R_{bo}$ is connected between terminal 30 and ground. The summing process depends on the negative feedback of voltage $E_{b1}$, which is determined by the magnitude of the output current, $i_o$, through $R_d$, to control winding 20 so that:

$$i_{in} \cong 0 \quad (1)$$

where $i_{in}$ is the current flowing through control winding 20. The feedback voltage $E_{b1}$ is related to the output voltage $E_o$ so that:

$$E_{b1} \cong E_o \quad (2)$$

Since the resistance of positive feedback winding 16 is very low, the sum of all the currents into control terminal 28 is:

$$\frac{E_{a1}-E_{x1}}{R_{a1}}+\frac{E_{a2}-E_{x1}}{R_{a2}}+ \cdots + \frac{E_{an}-E_{x1}}{R_{an}}+\frac{0-E_{x1}}{R_{ao}}-i_{in}=0 \quad (3)$$

and the sum of all the currents into control terminal 30 is:

$$\frac{E_{b1}-E_{x2}}{R_{b1}}+\frac{E_{b2}-E_{x2}}{R_{b2}}+\dots+\frac{E_{bm}-E_{x2}}{R_{bm}}+\frac{0-E_{x2}}{R_{bo}}+i_{in}=0 \quad (4)$$

where $E_{x1}$ is the voltage of terminal 28, $E_{x2}$ is the voltage of terminal 30, $m$ and $n$ are any positive integers other than zero, and $i_{in}$ is assumed to be flowing in the direction indicated by the arrow in Fig. 1. The value of $i_{in}$ is:

$$i_{in}=\frac{E_{x1}-E_{x2}}{R_f} \quad (5)$$

where, $R_f$ is the resistance of control winding 20. Solving Equation 15, for $E_{x1}$ yields:

$$E_{x1}=E_{x2}+R_f i_{in} \quad (6)$$

By rearranging Equations 3 and 4 the following equations are obtained:

$$\frac{E_{a1}}{R_{a1}}+\frac{E_{a2}}{R_{a2}}+\dots+\frac{E_{an}}{R_{an}}=i_{in}+E_{x1}\left(\frac{1}{R_{ao}}+\frac{1}{R_{a1}}+\frac{1}{R_{a2}}+\dots+\frac{1}{R_{an}}\right)=i_{in}+\frac{E_{x1}}{R_{at}} \quad (7)$$

and $$\frac{E_{b1}}{R_{b1}}+\frac{E_{b2}}{R_{b2}}+\dots+\frac{E_{bm}}{R_{bm}}=-i_{in}+E_{x2}\left(\frac{1}{R_{bo}}+\frac{1}{R_{b1}}+\frac{1}{R_{b2}}+\dots+\frac{1}{R_{bm}}\right)=-i_{in}+\frac{E_{x2}}{R_{bt}} \quad (8)$$

where $$\frac{1}{R_{at}}=\frac{1}{R_{ao}}+\frac{1}{R_{a1}}+\frac{1}{R_{a2}}+\dots+\frac{1}{R_{an}} \quad (9)$$

and $$\frac{1}{R_{bt}}=\frac{1}{R_{bo}}+\frac{1}{R_{b1}}+\frac{1}{R_{b2}}+\dots+\frac{1}{R_{bm}} \quad (10)$$

Substituting the value of $E_{x1}$ from Equation 6 in Equation 7, yields:

$$\frac{E_{a1}}{R_{a1}}+\frac{E_{a2}}{R_{a2}}+\dots+\frac{E_{an}}{R_{an}}=i_{in}+\frac{E_{x2}+i_{in}R_f}{R_{at}}=i_{in}\left(1+\frac{R_f}{R_{at}}\right)+\frac{E_{x2}}{R_{at}} \quad (11)$$

Eliminating $E_{x2}$ from Equations 11 and 8 yields:

$$\frac{R_{at}E_{a1}}{R_{a1}}+\frac{R_{at}E_{a2}}{R_{a2}}+\dots+\frac{R_{at}E_{an}}{R_{an}}-i_{in}\left(1+\frac{R_f}{R_{at}}\right)R_{at}=\frac{R_{bt}E_{b1}}{R_{b1}}+\frac{R_{bt}E_{b2}}{R_{b2}}+\dots+\frac{R_{bt}E_{bm}}{R_{bm}}+i_{in}R_{bt} \quad (12)$$

Also, $$E_{b1}=pR_d i_{in} \quad (13)$$

or $$i_{in}=\frac{E_{b1}}{pR_d} \quad (14)$$

where $p$ is the open loop current gain of the amplifier. The relationship between $R_d$ and $R_{b1}$ is chosen to comply with:

$$R_d\leq\frac{R_{b1}}{10} \quad (15)$$

in order to insure that the gain of the amplifier is negligibly affected by $E_{x2}$.

From the foregoing it follows that:

$$\frac{R_{at}E_{a1}}{R_{a1}}+\frac{R_{at}E_{a2}}{R_{a2}}+\dots+\frac{R_{at}E_{an}}{R_{an}}=\frac{E_{b1}}{pR_d}(R_{at}+R_{bt}+R_f)+\frac{R_{bt}E_{b1}}{R_{b1}}+\frac{R_{bt}E_{b2}}{R_{b2}}+\dots+\frac{R_{bt}E_{bm}}{R_{bm}} \quad (16)$$

Since $E_{b1}$ substantially equals the desired output voltage $E_o$, then $$E_o\left[\frac{R_{at}+R_f}{pR_d}+R_{bt}\left(\frac{1}{pR_d}+\frac{1}{R_{b1}}\right)\right]=\frac{R_{at}E_{a1}}{R_{a1}}+\frac{R_{at}E_{a2}}{R_{a2}}+\dots+\frac{R_{at}E_{an}}{R_{an}}-\frac{R_{bt}E_{b2}}{R_{b2}}-\dots-\frac{R_{bt}E_{bm}}{R_{bm}} \quad (17)$$

If $pR_d$ is sufficiently large, so that:

$$\frac{pR_dR_{bt}}{R_{at}+R_f+R_{bt}}\gg R_{b1} \quad (18)$$

Equation 17 may be written as follows:

$$\frac{E_oR_{bt}}{R_{b1}}=\frac{R_{at}E_{a1}}{R_{a1}}+\frac{R_{at}E_{a2}}{R_{a2}}+\dots+\frac{R_{at}E_{an}}{R_{an}}-\frac{R_{bt}E_{b2}}{R_{b2}}-\dots-\frac{R_{bt}E_{bm}}{R_{bm}} \quad (19)$$

If the algebraic equation it is desired to solve is:

$$E_oK_{b1}=K_{a1}E_{a1}+K_{a2}E_{a2}+\dots+K_{an}E_{an}-K_{b2}E_{b2}-\dots-K_{bm}E_{bm} \quad (20)$$

where $K_{a1}$, $K_{a2}$ . . . $K_{am}$, $K_{b1}$, $K_{b2}$ . . . $K_{bm}$ are positive real numbers, it is necessary to evaluate the resistances $R_{ao}$, $R_{a1}$, $R_{a2}$ . . . $R_{an}$, $R_{bo}$, $R_{b1}$, $R_{b2}$ . . . $R_{bm}$ so that Equation 19 will give solutions for $E_o$ identical to those obtained from Equation 20. For this to be true, then:

$$k_p=\frac{\frac{R_{at}}{R_{a1}}}{K_{a1}}=\frac{\frac{R_{at}}{R_{a2}}}{K_{a2}}=\dots=\frac{\frac{R_{at}}{R_{an}}}{K_{an}}=\frac{\frac{R_{bt}}{R_{b1}}}{K_{b1}}=\frac{\frac{R_{bt}}{R_{b2}}}{K_{b2}}=\dots=\frac{\frac{R_{bt}}{R_{bm}}}{K_{bm}} \quad (21)$$

or $$k_p=\frac{\frac{R_{at}}{R_{a1}}+\frac{R_{at}}{R_{a2}}+\dots+\frac{R_{at}}{R_{an}}}{K_{a1}+K_{a2}+\dots+K_{an}}=\frac{\frac{R_{bt}}{R_{b1}}+\frac{R_{bt}}{R_{b2}}+\dots+\frac{R_{bt}}{R_{bm}}}{K_{b1}+K_{b2}+\dots+K_{bm}} \quad (22)$$

where $k_p$ is a proportionality constant which will be evaluated later. Then from Equation 9 it follows that:

$$\frac{R_{at}}{R_{a1}}+\frac{R_{at}}{R_{a2}}+\dots+\frac{R_{at}}{R_{an}}=1-\frac{R_{at}}{R_{ao}} \quad (23)$$

and from Equation 10 it follows that:

$$\frac{R_{bt}}{R_{b1}}+\frac{R_{bt}}{R_{b2}}+\dots+\frac{R_{bt}}{R_{bm}}=1-\frac{R_{bt}}{R_{bo}} \quad (24)$$

Now let $K_{at}$ be defined as:

$$K_{at}=K_{a1}+K_{a2}+\dots+K_{an} \quad (25)$$

and $K_{bt}$ be defined as:

$$K_{bt}=K_{b1}+K_{b2}+\dots+K_{bm} \quad (26)$$

Substituting Equations 23, 24, 25 and 26 in Equation 22 yields:

$$k_p=\frac{1-\frac{R_{at}}{R_{ao}}}{K_{at}}=\frac{1-\frac{R_{bt}}{R_{bo}}}{k_{bt}} \quad (27)$$

In order to obtain realizable values for the resistances $R_{ao}R_{bo}$ the proportionality constant $k_p$ is assigned the values of $$k_p=\frac{1}{K_{bt}} \text{ or } k_p=\frac{1}{K_{at}} \quad (28)$$

whichever is the smaller. If $$\frac{1}{K_{bt}} \text{ is less than } \frac{1}{K_{at}}$$

then:

$$R_{ao}=\frac{R_{at}K_{bt}}{K_{bt}-K_{at}}, \text{ and } R_{bo}=\infty \quad (29)$$

the value for any resistor $R_{ai}$ is given by:

$$R_{ai}=\frac{R_{at}K_{bt}}{K_{ai}} \quad (30)$$

and the value for any resistor $R_{bi}$ is given by:

$$R_{bi}=\frac{R_{bt}K_{bt}}{K_{bi}} \quad (31)$$

If $$\frac{1}{K_{at}} \text{ is less than } \frac{1}{K_{bt}}$$

then:

$$R_{bo}=\frac{R_{bt}K_{at}}{K_{at}-K_{bt}}, \text{ and } R_{ao}=\infty \quad (32)$$

the value for any resistor $R_{ai}$ is:

$$R_{ai}=\frac{R_{at}K_{at}}{K_{ai}} \quad (33)$$

and the value for any resistor $R_{bi}$ is:

$$R_{bi}=\frac{R_{bt}K_{at}}{K_{bi}} \quad (34)$$

The values for each of the coefficients $K_{a1}$, $K_{a2}$ . . . $K_{an}$ and $K_{b1}$, $K_{b2}$ . . . $K_{bm}$ are given, and the value of $p$ is known as is the value of $R_f$. Values for $R_d$, $R_{at}$ and $R_{bt}$ may be chosen to fulfill the basic assumption that $$\frac{pR_dR_{bt}}{R_{at}+R_b+R_{bt}}$$

is on the order of 100 or more times greater than $R_{b1}$ and that $R_{b1}$ is equal to, or greater than 10 $R_d$. Knowing these values it is possible to work out from Equations 29, 30, 31, 32, 33 and 34 the necessary values of each of the resistors, $R_{a1}$, $R_{a2}$ . . . $R_{an}$, $R_{a1}$ and $R_{b1}$, $R_{b2}$ . . . $R_{bm}$, $R_{bo}$ to solve the Equation 20 by analogy. It should be noted that if $K_{at}$ equals $K_{bt}$ then resistors $R_{bo}$ and $R_{ao}$ are both infinite, or they are omitted from the circuit.

There is no limit as to polarity or magnitude of the input voltages $E_{a1}$, $E_{a2}$ . . . $E_{an}$, $E_{b2}$ . . . $E_{bm}$ except that for accurate results $E_{b1}$, or $E_o$, must remain positive and within the limits over which $E_o$ is a linear function of $i_{in}$.

Figure 2:
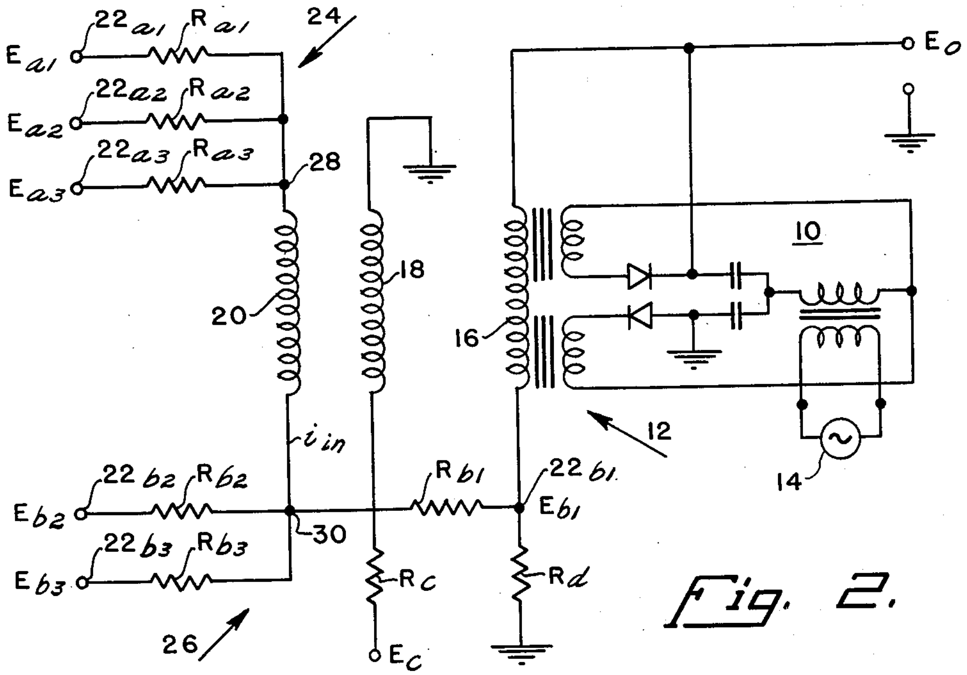
Fig. 2 is a schematic diagram of a modification of the summing magnetic amplifier.

In order to solve an equation of the form $$E_{b1}=E_{a1}+E_{a2}+E_{a3}-E_{b2}-E_{b3} \quad (35)$$

the modification illustrated in Fig. 2 is used. The values of the coefficients $K_{a1}$, $K_{a2}$, $K_{a3}$ and $K_{b1}$, $K_{b2}$, $K_{b3}$ are each equal to 1 so that $K_{at}$ equals 3 and $K_{bt}$ equals 3. Assuming a value of $R_{at}$ equals R′ and $R_{bt}$ equals R′ it follows that the value of resistors $R_{a1}$, $R_{a2}$, $R_{a3}$ are:

$$R_{a1}=R'\times 3\times\frac{1}{1}=3R' \quad (36)$$

$$R_{a2}=R'\times 3\times\frac{1}{1}=3R' \quad (37)$$

and $$R_{a3}=R'\times 3\times\frac{1}{1}=3R' \quad (38)$$

Similarly it can be shown that the values of each of the resistors $R_{b1}$, $R_{b2}$ and $R_{b3}$ are also equal to 3R′, or all the resistors of the input networks 24 and 26 are equal to each other. Since $K_{at}=K_{bt}$ there is no necessity for a grounded resistor corresponding to resistor $R_{ao}$ and $R_{bo}$ of Fig. 1. It is, of course, necessary that the conditions of Equations 15 and 18 be complied with.

Figure 3:
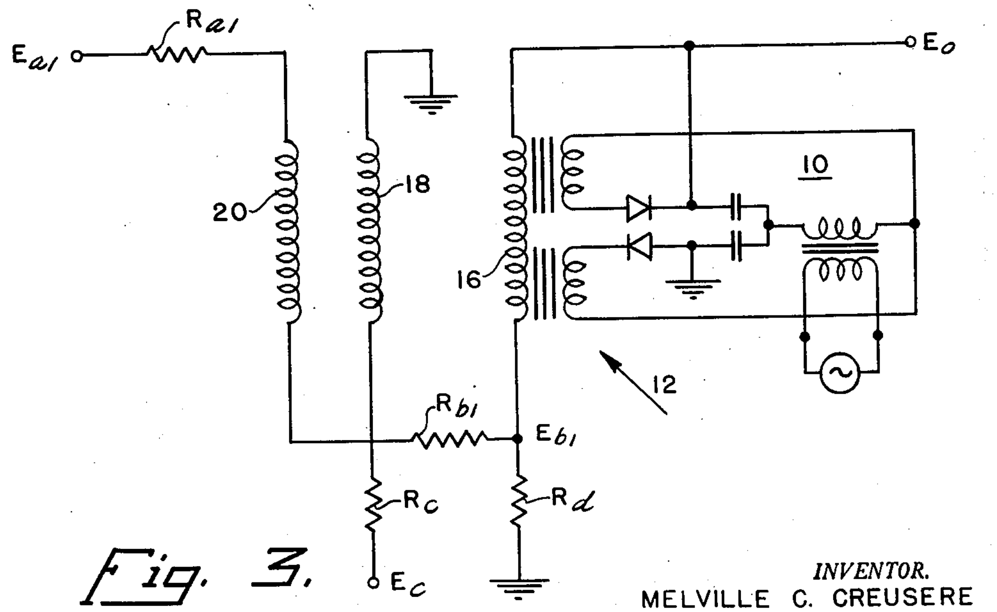
Fig. 3 is a schematic diagram of a second modification.

By modifying the circuit of Fig. 2 to that of Fig. 3, an effective isolation amplifier, one having a high input impedance and a low output impedance, is obtained.

Since the input impedance, $Z_{in}$ is defined as follows:

$$Z_{in}=\frac{E_{b1}}{i_{in}} \quad (39)$$

and since the magnitude of the current $i_{in}$ in control winding 20 is determined by $$i_{in}=\frac{E_{a1}}{pR_d} \quad (40)$$

it follows that:

$$Z_{in}=\frac{pR_dE_{a1}}{E_{b1}} \quad (41)$$

Since the relation between $E_{a1}$ and $E_{b1}$ is defined by:

$$E_{a1}\cong E_{b1} \quad (42)$$

it follows that:

$$Z_{in}=pR_d \quad (43)$$

Since the open loop current gain, $p$ of an amplifier of the type illustrated is on the order of 6000 and the reasonable value for $R_d$ is 1000 ohms, an input impedance $Z_{in}$ of 6 megohms can be easily obtained.

Obviously many modifications and variations of the present invention are possible in the light of the above teachings. It is, therefore, to be understood that within the scope of the appended claims the invention may be practiced otherwise than as specifically described.

What is claimed is:

1. A magnetic summing amplifier comprising a conventional voltage doubling magnetic amplifier having two magnetic cores adapted to produce an output voltage and an output current, a positive feedback winding through which the output current of said magnetic amplifier flows, a bias winding, a control winding having two control terminals, a first input circuit having "$n$" input terminals and "$n$" input resistors, each input resistor having two terminals, one terminal of each input resistor of the first input circuit being connected to one of the control terminals of said control winding, the second terminal of each input resistor being connected respectively to an input terminal of the first input circuit, a second input circuit having "$m$" input terminals and "$m$" input resistors, each input resistor having two terminals, one terminal of each input resistor of the second input circuit being connected to the other control terminal of said control winding, the second terminal of each input resistor of the second network being connected respectively to an input terminal of the second input circuit, "$m$" and "$n$" being integers other than zero, and substantially D. C. voltages adapted to be applied to the input terminals of the terminals of the two input circuits, the magnitude of one of the substantially D. C. voltages applied to one of the resistors of the second network being substantially equal to the output voltage, whereby the output voltage of said magnetic amplifier equals the sum of the voltages applied across the first network of said resistor, less the voltage applied across said second network with the exception of the voltage which is substantially equal to the output voltage which is applied to said second network.

2. An electrical device as defined in claim 1 in which the resistance of each resistor in said first and second input circuits is substantially equal.

3. An electrical device as defined in claim 1 in which "$m$" equals "$n$."

4. An electrical device as defined in claim 1 in which "$m$" and "$n$" equal three.

5. An electrical device as defined in claim 1 in which "$m$" and "$n$" equal one.

6. A summing magnetic amplifier for solving by analogy an equation of the form:

$$K_{b1}E_{b1}=K_{a1}E_{a1}+K_{a2}E_{a2}++K_{an}E_{an}-K_{b2}E_{b2}--K_{bm}E_{bm}$$

where $K_{a1}$, $K_{n2}$ . . . $K_{an}$ and $K_{b1}$, $K_{b2}$ . . . $K_{bm}$ are each positive real numbers, $E_{a1}$, $E_{a2}$ . . . $E_{an}$, $E_{b1}$, $E_{b2}$ . . . $E_{bm}$ are variables represented by substantially D. C. voltages, and "$m$" and "$n$" are positive integers other than 0, comprising a high gain magnetic amplifier having a control winding having first and second control terminals at the ends thereof, a positive feedback winding, a load resistor, a circuit means for causing substantially all the output current of said amplifier to flow through said feedback winding and said load resistor, a first and a second input circuit, said first input circuit having "$n$" input terminals and "$n$" input resistors of predetermined values, said input resistors being connected between an input terminal and the first control terminal of the control winding, said second input circuit having "$m$" input terminals and "$m$" input resistors of predetermined value, each of said input resistors of said second input circuit being connected between an input terminal of said second circuit and the second control terminal of control winding, input voltages $E_{a1}$, $E_{a2}$ . . . $E_{an}$ being connected respectively to the input terminals of the first circuit and input voltages $E_{b1}$, $E_{b2}$ . . . $E_{bm}$ being connected respectively to the input terminals of the second circuit, input voltage $E_{b1}$ being the voltage across the load resistor due to the output current flowing therethrough, means for connecting a first balancing resistor of predetermined value between said first control terminal and ground if $K_{bt}$ is greater than $K_{at}$, and means for connecting a second balancing resistor of predetermined value connected between the second control terminal and ground if $K_{at}$ is greater than $K_{bt}$, said balancing resistors being omitted if $K_{bt}$ equals $K_{at}$ where:

$$K_{at}=K_{a1}+K_{a2}+\ldots+K_{an}$$

and $$K_{bt}=K_{b1}+K_{b2}+\ldots+K_{bm}$$

7. A magnetic summing amplifier comprising a conventional voltage doubling magnetic amplifier having two magnetic cores adapted to produce an output voltage and an output current, a positive feedback winding through which the output current of said magnetic amplifier flows, a bias winding, and a control winding, each of said windings being around both of said cores, a first input circuit of parallel connected input resistors, each input resistor having one terminal connected to one terminal of said control winding, the other terminals of each of said input resistors of said first network adapted to be connected respectively to sources of substantially D. C. potential, a second network of parallel connected input resistors, one terminal of each of said input resistors in said second network connected to the second terminal of said control winding, the other terminal of each of said resistors in said second network adapted to be connected respectively to sources of substantially D. C. potential, the number of resistors in said first and second networks and the resistance of each resistor of said first and second network being substantially equal, the magnitude of one of the substantially D. C. voltages applied to one of the resistors of said second network being substantially equal to the output voltage, whereby the output voltage of said magnetic amplifier equals the sum of the voltages applied across the first network of said resistor, less the voltages applied across said second network with the exception of the voltage which is substantially equal to the output voltage which is applied to said second network.

References Cited in the file of this patent

UNITED STATES PATENTS

| | | |
|---|---|---|
| 2,401,779 | Swartzel | June 11, 1946 |
| 2,574,438 | Rossi et al. | Nov. 6, 1951 |